Aug. 24, 1943. J. W. BATCHELDER 2,327,852
DRIVE CONNECTIONS
Filed Jan. 9, 1942 2 Sheets-Sheet 1
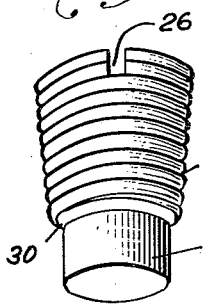
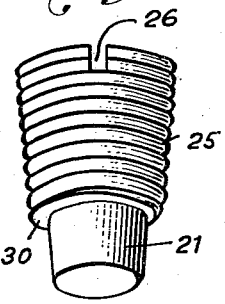
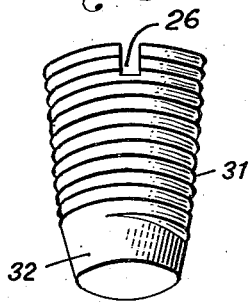
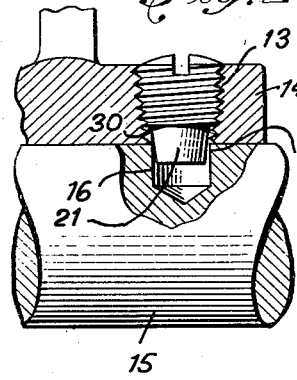
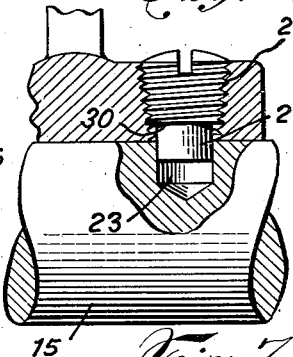
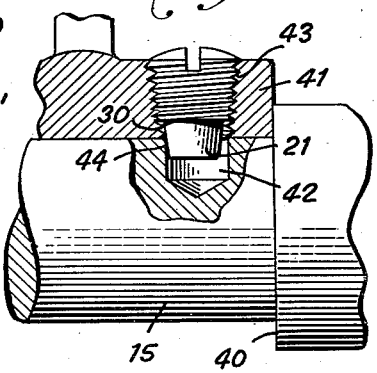
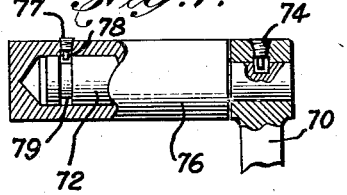
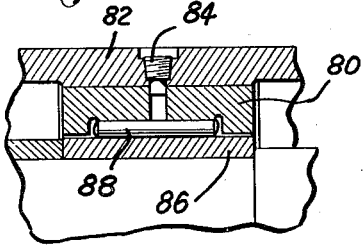
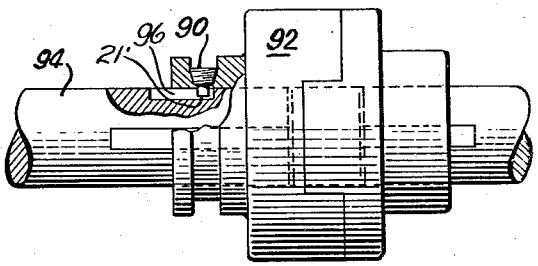
INVENTOR
James W. Batchelder
BY Bruun & Jones
ATTORNEYS Aug. 24, 1943.  J. W. BATCHELDER  2,327,852
DRIVE CONNECTIONS
Filed Jan. 9, 1942   2 Sheets-Sheet 2

INVENTOR
James W. Batchelder
BY Brown+Jones,
Attorneys

Patented Aug. 24, 1943

2,327,852

UNITED STATES PATENT OFFICE 2,327,852

DRIVE CONNECTION

James W. Batchelder, Waterbury, Conn.

Application January 9, 1942, Serial No. 426,147

5 Claims. (Cl. 287—52.08)

The present invention relates to drive connections, and more particularly to drive connections employing a novel form of set screw.

This application is a continuation in part of my copending application Serial No. 317,941, filed February 8, 1940, now Patent No. 2,293,882, dated August 25, 1942.

Set screws are used for a variety of purposes, but particularly to hold one object in place relative to another and principally to hold an annulus, or hub, fixed to the coaxial shaft which it surrounds, to prevent relative motion of the annulus, hub, and shaft.

Set screws, in the prior art, have a variety of forms, all of which, to the best of my knowledge, include a straight threaded portion with means on one end for applying driving means and variously-shaped points on the opposite end. In all fastenings secured by set screws, the security of the fastening is dependent upon the set screw's maintaining its initial secured position and axial thrusting force. In all straight threaded set screws, the resistance to backing off of the set screw is dependent upon the friction between the thread of the set screw and the thread of the hole through which it is driven, and the friction between the point of the set screw and the part on which it bears. This friction is proportional to the pressure of the set screw thread against the surrounding thread and may result either from the use of an over-size set screw which must be driven forcefully into its mating thread, or it may result by the thrust of the point of the set screw being transmitted through the body of the set screw to the bearing surfaces between the set screw thread and the mating thread. The common method of securing set screws against backing off under the influence of vibration and other disturbances is, therefore, to drive the point tightly against one of the parts secured and thus by means of thrust transmitted, develop frictional resistance to backing off both in the thread and at the point of bearing.

I have discovered by repeated tests on many types of set screw points that a properly tightened set screw fastening will not loosen up under the effects of vibration or any other influence, except by the application of the driving means to turn the screw in the direction to loosen it, provided the load transmitted by the point of the set screw does not equal or exceed the value which produces a permanent deformation of the point of the set screw or of the part with which it is engaged. If this critical load is exceeded, it will result in the relieving of the axial thrusting force developed at the point of the set screw when the transmitted load is removed. So long as the axial thrust between the point of the set screw and the engaging part remains substantial, the set screw cannot be backed out except by torsional effort applied to rotate the set screw in the backing off direction. As soon as there is a permanent deformation of either of the engaging parts, there will exist, under the influence of periodic loads on the secured parts or under the influence of a superimposed vibration, times when there is no pressure on the point of the set screw to produce frictional resistance in the thread against turning. At these instants, the set screw can be turned, however slightly, by any slight disturbing force and under the influence of sustained vibration, the cumulative effort can eventually result in the backing off of the set screw to the point where the driving connection is broken. Even though the disturbing influences may be such as to move the set screw first in the tightening direction and then in the loosening direction, due to the influence of the thread helix, the combined influence of vibration and a periodic bearing of the set screw point on the driven part will be such as to produce an average net displacement in the direction of loosening the set screw. After the critical load capacity of the set screw has been exceeded, the disturbing effect of vibration is, therefore, always such as to result in the ultimate loosening of the set screw. Manufacturers and users of set screws have failed to recognize that the security of set screw fastenings over long periods of use depended upon keeping the loading of the point below the elastic limit of the materials involved as described above.

In the light of my experience in testing set screws, and in view of the resulting explanation of the security of set screw fastenings outlined above, a primary object of my invention is to produce a set screw as a means for fastening two parts against relative motions in such manner that the security of the fastening against loosening under vibration should be independent of all axial thrusting forces and any deformation of the point of the set screws or the part with which the screw point is engaged.

A further object of the invention is the provision of a set screw having an increased load carrying capacity within the limits of security against loosening under the influence of vibration.

A third object of this invention is to provide a drive connection employing a set screw which can be used many times without impairment of its self-locking characteristic.

The first-mentioned object is accomplished by manufacturing a set screw combining a tapered threaded portion and any desired combination of point and driving means. By using a tapered thread on the set screw and a tapered thread in the hole through which the set screw is driven, I obtain an action similar to that previously described in which an over-size set screw is driven into the threaded hole in which it fits tightly, but I avoid the objectionable features of the over-size set screw by providing a screw which may be easily driven into its mating thread up to the point where the screw begins to fit tightly into the thread. I further provide a tightly engaged thread in which wear of either part does not result in a gradual failure of the securing action, since wear resulting from repeated tightening and loosening of the fastening can always be compensated for by driving the screw a bit further into the tapered mating threads. It is practicable, with my design, always to proportion the point relative to the threaded body so that the bearing between the point and a member which it secures will suffer permanent deformation under load before the bearing loads transmitted to the threaded body exceed those which produce permanent deformation in the thread. With this type of design, a knowledge of the strength of the fastening secured by the point will always be a sufficient basis for establishing load capacity of the screw, and there is no danger that the fastening so designed and secured will loosen under the influence of vibration. This fact I have established by repeated tests at loads exceeding the yielding strength of the point. In no case during my tests has any fastening secured by the set screw of my present invention ever failed due to loosening of the set screw.

Another important object of this invention is the provision of self-locking characteristics in a set screw without the use of non-standard forms of threads, it being practicable to form the screw of the present invention with threads of the American National Pipe Standard and/or the British Whitworth Pipe thread standard, as well as other standard forms of thread.

A further object of this invention is the provision of a drive connection employing a self-locking set screw of such design that standard tools, such as screw drivers, wrenches, and the like, may be used to drive the screw. In this connection, it may be stated that the driving end of the screw included in the present invention may be of conventional construction. Additionally, the self-locking set screw may be formed of a single piece adaptable to modern production in high-speed machinery.

Another important object of this invention is to reduce the number of mechanisms in which keys and keyways may be required for the transmission of torque by providing a set screw secured against loosening under vibration and with increased load carrying capacity.

A still further important object of this invention is to provide a drive connection for securing two elements together for a transmission of effort from one to the other in one direction while maintaining freedom for relative sliding at right angles to this direction. The set screw of this invention provides such a fastening, when its tapered threaded portion is driven tightly into a tapered threaded hole in one of the members secured, with its cylindrical point engaging an elongated aperture or slot in the other member. Since the diameter of the point of the set screw is always less than the mean diameter of the thread, the moment of frictional resistance to backing off, developed in the tapered threads, is always greater than the moment of frictional force on the point tending to turn the screw during the sliding of the point on the member against which it bears. My set screw, if properly applied, can never be loosened by such sliding action. Such simple means of providing a sliding engagement secured against loosening of the fastening has not heretofore been available. The common practice has been the use of spline connections, oval or rectangular shafts in similar holes, or keys and keyways; it has not heretofore been practicable to provide such a fastening with a one-piece self-locking set screw. The load carrying capacity of the sliding connection described above is limited by the "Brinelling" load for a cylinder bearing on a flat surface. There are many applications of sliding connections where this capacity is adequate. Where greater load carrying capacity is required, some of the advantages of this form of sliding connection can be preserved by the addition of a shoe member sliding in the slot and having a cylindrical hole in its center to receive the cylindrical point of the set screw.

The set screw used in the drive connection of the present invention comprises a threaded, tapered body portion and a non-threaded extended end portion or point, which latter may or may not be tapered. Any such form of set screw is particularly adapted to securely lock together two elements when the one element is provided with a threaded aperture to receive the threaded body of the set screw, with the other portion of the set screw extending into an aperture in the other element.

According to one form of the present invention, the aperture of the second element would be cylindrical and of greater depth than the length of the extending end of the screw, and of a diameter substantially corresponding to the diameter of the tap drill used to form a threaded aperture in the collar. That is, the aperture will approximately equal the smallest diameter of the threaded aperture, but be slightly larger than the diameter of the tip of the set screw of this invention. By another form of the invention, the aperture in the inner element is of less diameter than the root diameter of the threads at the smallest diameter of the threaded body.

It is to be noted that the present form of locking screw cooperates with the shaft in a manner to preclude a marring thereof which permits the hub or other outer element to be easily removed from the shaft as compared to a form of set screw which mars the surface of the shaft, thus making axial movement of the hub on the shaft difficult. To avoid this draw-back, it has been the practice in the past to undercut the shaft to receive the end of the set screw; but no cooperation has been established between the undercut and the set screw, otherwise than to permit endwise engagement of the set screw with the shaft. The present invention provides a permanent locking means which does not interfere in the least with a ready separation of the hub and shaft elements.

Other objects and advantages of the invention will be apparent from the specification and drawings, in which:

Figure 1 is a perspective view of a set screw employed by one form of the invention;

Figures 2 and 3 are views partly in section of a drive connection employing the screw shown in Figure 1;

Figures 4 and 5 are perspective views of modifications of the screw shown in Figure 1;

Figure 6 is a view partly in section of a drive connection embodying the screw of Figure 4;

Figures 7 through 9 are views of modifications of the drive connections of the invention;

Figure 10:
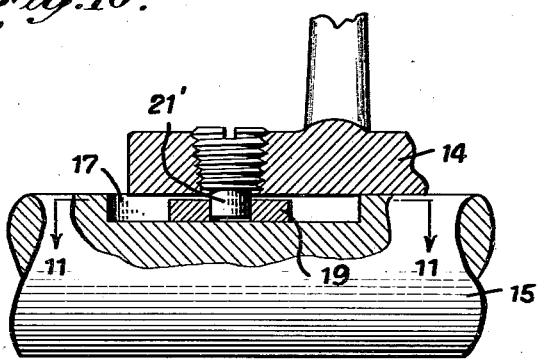
Figure 10 is a view partly in section of a modified form of a sliding connection utilizing the set screw of the invention.

In the form of the invention shown in Figure 1, the set screw is provided with a tapered end portion or extension 21 and a tapered threaded body portion 25. As shown, the largest diameter of the tapered end portion 21 is adjacent but smaller than the smallest diameter of the threaded body portion, there being a shoulder 30 between the two portions.

The use of this form of invention is illustrated in Figures 2 and 3. In Figure 2, the set screw is associated with a hub element 14 in which a tapered threaded aperture is formed. The hub 14 is positioned on a shaft 15 in which there is an aperture or recess 16 formed. The tapered end 21 of the set screw extends into the recess 16, the recess being aligned with respect to the threaded aperture. The set screw is driven into the hub until the threads on the screw and hub lock the set screw firmly in place. As shown, the dimensions of the parts are such that there is not a complete frictional engagement between the surface of the recess 16 and the end portion 21. The tapered end, extending into the recess, transmits torque between the shaft and the hub, and during such operation, a portion of the surface of the recess bears against a portion of the surface of the extended end of the set screw. The set screw is locked in position and remains so even though the material of the shaft adjacent the recess and/or the material of the set screw end 21 is deformed due to an overload being applied by the transmitted torque. The set screw is so firmly locked in position it continues to remain firmly held in the hub 14 without becoming loose and without backing out, even in the extreme case where the set screw end 21 is broken off.

It is possible under certain circumstances, where fine workmanship is available, to have the dimensions of the set screw so exactly chosen that the end 21 enters into annular frictional engagement with the surface of recess 16 at the same time which the tapered threads of the screw reach locking engagement with the threads of the hub. The combination of parts just described above gives a double-locking effect. This double-locking, however, is, in most cases, unnecessary, as the hub is effectively secured to the shaft 15 by the means shown in Figure 2.

An additional function which the locking screws may be made to perform is disclosed in Figure 3 wherein the shaft upon which the hub is mounted is provided with a shoulder 40, against which the hub 41 is adapted to abut. The shaft is provided with the usual aperture or recess 42 for cooperating with the extending end portion of the locking screw, and the hub has a threaded tapered aperture 43 for engaging the body portion of the locking screw. It will be noted that in the previous disclosure of the use of these locking screws, that the vertical center-line of the threaded aperture and the recess was at least almost coaxial. However, as clearly shown in Figure 3, the vertical center-line of the threaded aperture is arranged parallel to the vertical center-line of the recess but is displaced axially along the shaft away from the shoulder, so that when the locking screw is driven home, the extended tapered end portion will engage one side only of the cylindrical recess as at 44, thus forcing hub 41 into abutting relation with shoulder 40. In this use of the set screw shown in Figure 1, the dimensions of the set screw must be chosen so that the tapered end engages one side of the recess at substantially the same time as the tapered threads of the screw lock into the tapered threads of the hub 41. With this arrangement of parts, as with that of Figure 2, the hub and shaft do not become free from one another, even though long use may deform the end of the screw or the shape of the recess because independently of any such deformation, the screw remains locked in place. The hub and shaft do not actually become free from each other unless the extending end of the screw is entirely broken off.

In Figure 4, there is shown a screw with a tapered threaded body portion 20 and a cylindrical end portion 21' extending from the smaller end of the body with shoulder 30 therebetween.

The use of this form of the invention is shown in Figure 6 wherein the extended end 21' has a close fit with the cylindrical recess 23 in the shaft 15. In the case of the cylindrical end portion 21', the fit between the sides of the end portion and the recess may be fairly tight without the other dimensions having to be too exact. The cylindrical end is forced into the recess until the threads of the screw and hub lock together. With this combination of parts, as with all the others described herein, the end does not seat against a bottom of the recess.

Figure 5 shows a set screw having a tapered threaded body portion 31 and a tapered extending end portion 32. The largest diameter of the end portion is adjacent to and equal to the diameter of the smaller end of the threaded body portion.

In Figures 7, 8, and 9, other uses of the set screws shown in Figures 1, 4, and 5 are disclosed. In Figure 7, a crank pin 72 is attached to the end of a crank arm 70 by means of a set screw 74, and a crank handle 76 is attached to the crank pin so as to be rotatable with respect thereto but not to be slidable axially along the same. To accomplish this, a set screw 77 having a tapered thread is secured to a tapered threaded aperture 78 in the crank handle 76. The extended end of the set screw 77 extends into an annular recess 79 in the crank pin. The tapered threads permanently lock the set screw into the crank handle. The set screw 77 riding in the recess 79 permits the crank handle to rotate about the crank pin but prevents the former from sliding lengthwise of the latter.

A needle-bearing outer race holder is shown in Figure 8. The bearing outer race 80 is held fixed with respect to the fixed bearing housing 82 by means of the set screw 84. The latter has a tapered thread lockingly driven into a tapered threaded aperture in the housing and has an extended end positioned in an aperture in the outer race 80. The rotatable shaft and inner race 86 are separated from the outer race by a plurality of needles 88 circumferentially disposed about the inner race 86.

A jaw clutch is illustrated in Figure 9. The tapered threaded set screw 90 is driven into a tapered threaded aperture in the sliding half 92 of the clutch until it is locked therein. The cylindrical end 21' of the set screw 90 extends into an elongated aperture or axial slot 96 in the surface of the shaft 94, permitting the clutch member 92 to move axially with respect to the shaft a distance only sufficient to permit disengagement of the clutch. Since the set screw is frictionally locked by its tapered thread into the clutch member, there is no danger of the screw becoming loose. A key (not shown) in the bore of the clutch member 92 engages a keyway in the shaft 94 to carry the relatively great torsional loads between the clutch and shaft, while the extending end of the tapered set screw acts to limit the axial movement of the clutch member 92.

Figure 11:
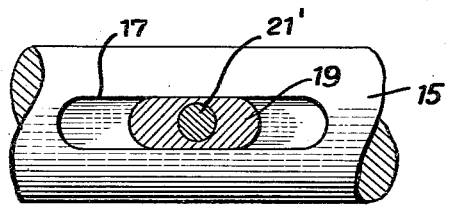
Figure 11 is a view of the connection shown in Figure 10, taken perpendicularly to the plane of Figure 10 and at a plane containing line 11—11.

It is sometimes necessary that a sliding connection be able to carry a greater load than the "Brinelling" load computed for a cylinder the size of the set screw cylindrical point when bearing on a flat surface where the torsional loads are so small that keys, splines, etc., would afford much more than the necessary strength. Under such conditions, the connections shown in Figures 10 and 11 may be used. A set screw with extended point 21' is driven into a tapered threaded aperture in a hub element 14. The hub element is positioned on shaft 15 which has a slot 17 in its surface parallel to the shaft axis. Slidable along the slot is a shoe member 19 which has a cylindrical hole therein for receiving and reinforcing the point 21' of the screw.

It is to be understood that the following claims are intended to cover all of the generic and specific features of the invention herein described, and all statements of the scope of the invention, which as a matter of language, might be said to fall therebetween.

I claim:

1. The combination of a shaft having a slot therein, an element slidable in said slot and having an opening formed therein, a hub movably positioned on said shaft, said hub being provided with a threaded, tapered aperture, and a set screw for fixing said hub to said shaft, said set screw having a threaded tapered portion for cooperating with said threaded aperture and having also an integral end portion for cooperating with said opening, said set screw being adapted to be driven into said threaded aperture until said tapered, threaded portion frictionally locks said screw in place with said integral end extending into said opening to prevent relative motion of one kind between said hub and said shaft and to provide for relative motion of another kind between said hub and said shaft.

2. Means for holding two relatively slidable members against more than a predetermined, maximum, axial, and circumferential movement comprising a tapered threaded bore in the outer of said members, and a recess having a cylindrical wall in the other of said members and a tapered set screw adapted to be threaded into said tapered bore until it locks by frictional engagement of the threads, said set screw having an unthreaded end, said locking taking place before the unthreaded end reaches the bottom of the cylindrical recess.

3. Means for holding two relatively slidable members against more than a predetermined, maximum movement comprising a tapered threaded bore in one of said members and a recess having a cylindrical wall in the other of said members and a tapered set screw adapted to be threaded into said tapered bore until it locks by frictional engagement of the threads, said set screw having an unthreaded end, said locking taking place before the unthreaded end reaches the bottom of the cylindrical recess.

4. Means for holding two relatively slidable members against more than a predetermined maximum movement in one direction and for providing a relatively large, predetermined maximum movement in another direction and comprising a tapered threaded bore in one of said members and an elongated aperture in the other of said members and a tapered set screw adapted to be threaded into said tapered bore until it locks by frictional engagement of the threads, said set screw having an unthreaded end adapted to extend into said aperture when said screw is locked.

5. Means for holding two relatively movable members against more than a predetermined movement comprising a tapered threaded bore in one of said members and an aperture in the other of said members and a tapered threaded set screw adapted to be threaded into said tapered bore until it locks by frictional engagement of the threads, said set screw having an unthreaded end adapted to extend into said aperture when said screw is locked.

JAMES W. BATCHELDER.